Nov. 7, 1944.   H. C. MILLAR   2,362,390
MANUFACTURE OF FURFURAL AND FERTILIZER
Filed Aug. 3, 1940
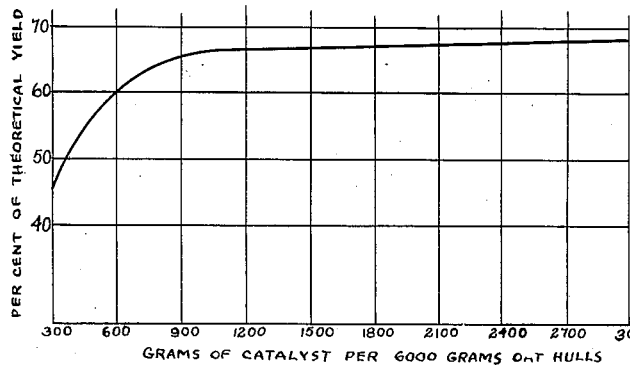
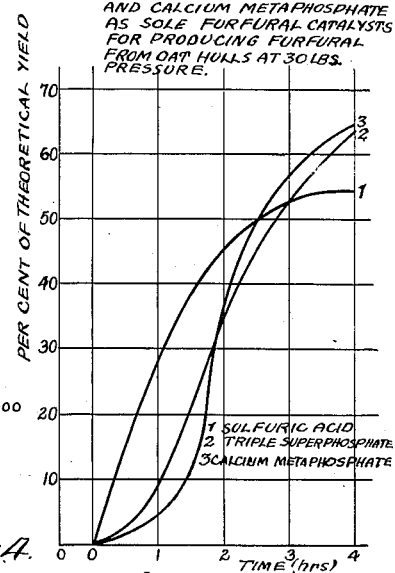
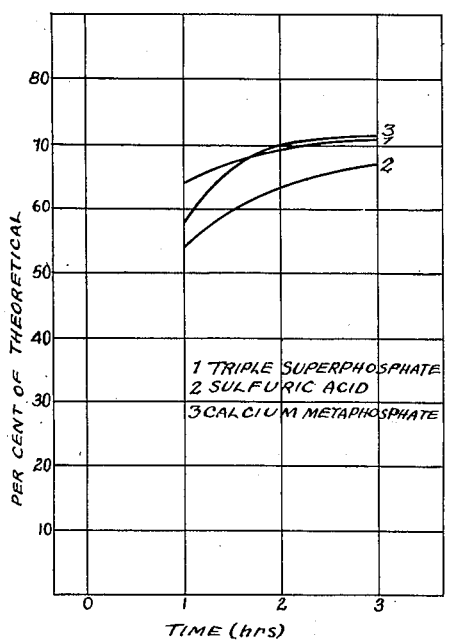
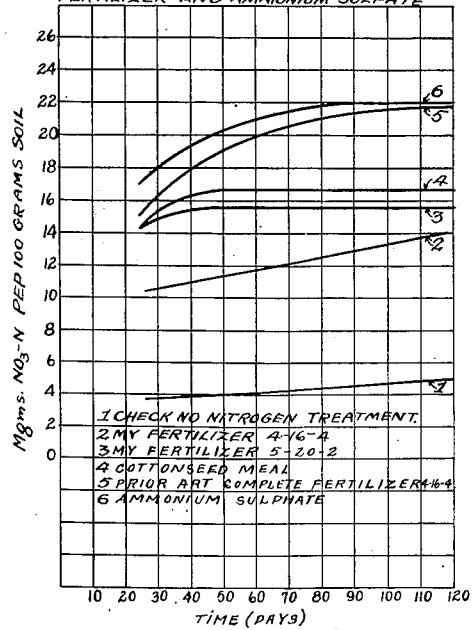
Inventor:
Harvey C. Millar
By Thiess, Olsen & Mecklenburg
Attys.

Patented Nov. 7, 1944

2,362,390

UNITED STATES PATENT OFFICE 2,362,390

MANUFACTURE OF FURFURAL AND FERTILIZER

Harvey C. Millar, Western Springs, Ill., assignor to The Quaker Oats Company, Chicago, Ill., a corporation of New Jersey Application August 3, 1940, Serial No. 350,336

24 Claims. (Cl. 71—25)

The present invention relates to an improved method of preparing furfural from pentosan-containing materials such as oat hulls, cottonseed hulls, corncobs, bagasse, beet pulp, woods, straws, and the like.

More particularly, the invention relates to an improved method for simultaneously producing furfural and a novel fertilizer or plant food which constitutes a valuable by-product of the reaction process when carried out in accordance with the present invention.

Heretofore in the manufacture of furfural it has been customary to treat pentosan-containing materials by heating a dampened or aqueous pentosan-containing mass in the presence of sulfuric acid or hydrochloric acid as a catalyst, and thereafter removing the furfural as formed by boiling or by distilling the reaction mixture with steam. Although substantial commercial yields of furfural have been obtained by these methods, the present process is more satisfactory from several standpoints.

Many of the prior art catalysts produce optimum yields of furfural only over a very limited range of the operating conditions and catalyst concentration, since the most effective catalyst concentration varies as the operating conditions are altered. Moreover, some of the prior art catalysts that have been used commercially necessitate the use of pressures in the reaction chamber of approximately 60 pounds gauge or more in order to produce optimum yields of furfural. these higher pressures requiring the use of more expensive equipment. The equipment cost is further increased when sulfuric acid is used as the catalyst, since this requires the use of acid-resistant materials in fabricating the digester.

Again, with the prior art sulfuric acid catalyst, certain pentosan-depleted by-products (for example, that of corn-cobs) remaining after the removal of the furfural have the general consistency and appearance of tar, which condition renders them difficult to handle and to remove from the cooker. Moreover, such residue has little if any value. Attempts to convert this by-product into a fertilizer have heretofore been unsuccessful. Furthermore, the acid content of the prior art by-product decomposes the fertilizer shipping bags and tends to make the soil acid.

Complete fertilizers prepared by the usual processes of the prior art must be used with extreme caution to avoid burning when applied to vegetation in large applications. Furthermore, their nitrogen is easily leached to the drainage waters. Again, the prior art fertilizers do not add organic matter to the base of the plants, where it is badly needed as a mulch and as a source of energy for microorganisms. Also, the prior art complete commercial fertilizers are conspicuously noticeable when used in a home beautification program. The existing organic fertilizers are usually some type of animal refuse and produce an undesirable odor when wet.

An object of the present invention is to provide a new and improved method of manufacturing furfural which obviates many of the disadvantages of the prior art processes.

A further object is to provide an improved catalyst for the production of furfural in higher yields and at a higher rate of conversion than attainable using the prior art catalysts.

A further object of the invention is to manufacture furfural in high yields and at a high rate of conversion while simultaneously producing a commercial cellulosic by-product which may be readily removed from the digester and which possesses high fertilizer value.

Another object is to produce furfural at lower pressure and in higher yields than can be obtained using sulfuric acid under comparable operating conditions, while simultaneously producing a valuable, phosphated and ammoniated fertilizer from the pentosan-depleted residue.

Other objects and advantages of the present invention will be hereinafter pointed out, or will be apparent to those skilled in the art after a further description of the invention is made.

The invention further contemplates a phosphated, partially degraded, pentosan-depleted cellulosic material which will fix ammonia under widely varying pressures and temperatures to produce a fertilizer high in finely divided organic matter with excellent physical properties, and which will not decompose storage or shipping bags, burn vegetation when applied to the soil even in large quantities, have its nitrogen rapidly leached from the soil, produce an undesirable odor when wet, or become undesirably conspicuous when applied to the soil around the home.

Other objects will be apparent as the invention is hereinafter more fully described.

An important feature of the present invention resides in the provision of new and improved catalysts which are capable of producing high yields of furfural from pentosan-containing cellulosic materials at a high rate of conversion. The catalysts, in accordance with the present invention, comprise forms of orthophosphate salts which, under digester reaction conditions, exhibit acidic properties. As specific examples of such orthophosphate salts, mention may be made of hemibasic calcium phosphate, monocalcium phosphate (conveniently available on the market as "triple" or "double" superphosphate, both terms connoting the same product), hemibasic sodium phosphate, aluminum acid phosphate, and calcium metaphosphate, the last named being converted into the ortho form under reaction conditions.

In passing, it may be mentioned that although calcium metaphosphate is water insoluble, and therefore non-acidic under ordinary conditions, it apparently undergoes hydrolysis in the digester; at any rate it becomes acidic under operating conditions and therefore is classified as above as an orthophosphate.

In its preferred form the invention involves the hydrolysis of pentosan-containing cellulosic materials in the presence of water and any suitable quantity of an acid-reacting orthophosphate salt as described above. The resulting pentoses, when formed, are dehydrated to produce furfural, and the furfural and water are separated from the pentosan-depleted cellulosic material. The cellulosic residue is then ammoniated, and if desired the ammoniated residue may be incorporated with a supplementary plant food or foods, such as potassium chloride or the like. By varying the amount of catalyst used, the amount of ammonia employed in the ammoniation step, and the amount of supplementary plant food added to the ammoniated residue, it is possible to produce a fertilizer of predetermined specifications,—for example, one containing 5 parts nitrogen (as N), 20 parts $P_2O_5$, and 2 parts $K_2O$, i. e., a "5–20–2" fertilizer, to use the customary method of indicating its analysis. In the same manner the conditions may readily be adjusted to produce a fertilizer of any other specifications—for example, a 4–16–4 fertilizer.

In carrying out the process in accordance with one form of my invention, I prefer to employ oat or cottonseed hulls as a convenient source of pentosan-containing material. These oat or cottonseed hulls are treated with water and the orthophosphate salt catalyst by subjecting the same to heat and pressure sufficient to hydrolyze the material, preferably while maintaining the water content thereof substantially undiminished. The reaction mass is then preferably subjected to additional heat and the continuous flow therethrough of a moisture-absorbing gas, such as superheated steam having a sufficiently high heat content, to remove the furfural as rapidly as formed, and simultaneously to dry the pentosan-depleted residue.

The orthophosphate salts, which develop acidic properties under digester conditions, constituting the catalyst of the present invention produce extraordinary good yields of furfural, and moreover, during the digestion period in which the pentosan-depleted by-product is being produced, the residue is converted to a phosphated form having exceptionally good plant growth-promoting properties. Then in this one simple continuous process, the mass is treated with ammonia to bring the nitrogen content to the desired value. This phosphate ammoniated residue is easily handled, will not decompose fertilizer shipping bags, will not burn growing vegetation, is not conspicuous when used, develops no odor, protects its nitrogen from being rapidly leached, produces a soil mulch and adds energy for soil microorganisms, thereby aiding them in carrying out their soil fertility processes.

I have further found that the amount of catalyst in accordance with the present invention can be varied over an extremely wide range without impairing the yield of furfural. This feature of my improved catalyst is of great importance in the production of the phosphated residue, inasmuch as it enables one to produce a fertilizer having precisely the phosphate content desired by proper adjustment of the proportion of catalyst and pentosan-containing starting material. Furthermore, the catalysts of the present invention are much more versatile in their nature than sulfuric acid, since exceptionally good yields of furfural can be obtained at pressures as low as 30 pounds gauge. This offers a distinct advantage over the use of sulfuric acid which produces very inferior yields at pressures as low as 30 pounds gauge. The catalysts of the present invention, therefore, render it possible to operate under considerably lower pressures, thereby permitting the use of less expensive equipment than that required when using prior art catalysts. Furthermore, a less degraded cellulosic by-product, available for other uses besides fertilizers, is obtained when operating at 30 pounds pressure with my catalyst than is obtainable under any conditions optimum with respect to furfural production when using sulfuric acid as the catalyst.

In addition to the foregoing advantages, the process of the present invention has the following desirable features:

1. The furfural is liberated much more rapidly from the pentosan-containing material than has been possible using sulfuric acid as a catalyst. The cooking time may therefore be reduced to a minimum, thereby saving labor and operating costs.

2. Better yields of furfural can be obtained from pentosan-containing material with acid-reacting orthophosphate salts than with sulfuric acid as a catalyst.

3. The acid-reacting orthophosphate salts are less difficult and dangerous to handle than sulfuric acid.

4. Steel digesters may be used instead of the expensive copper equipment necessary with sulfuric acid.

5. The acid-reacting orthophosphate salts give a residue which is granular or fibrous in nature, depending on operating conditions, and which is very easy to remove from the digester and handle in connection with packing and ultimate use of fertilizer.

6. The residue produced in accordance with the present invention contains phosphorus, part of which is chemically bound with the organic matter. The residue may be ammoniated at low temperatures and pressures and, when the ammoniated product is supplemented by additional salts, provides a complete commercial fertilizer of high analysis.

7. The phosphorus and nitrogen added as a result of the use of my catalyst and the subsequent ammoniation of the residue are in a readily available form, and the nitrogen content of the by-product nitrifies at about the same rate as cottonseed meal. As a result, the nitrogen content is protected from leaching out of the soil under conditions of high rainfall.

8. The complete fertilizer produced from the phosphated ammoniated residue produces only a slight change in the pH of the soil to which it is applied, as compared with a conventional complete commercial fertilizer of the same analysis or with ammonium sulfate. The fertilizer of the present invention may be applied to lawns in large quantities, and requires no special precautions to prevent burning or any ill effects to the vegetation whatsoever. Moreover, the color of my improved fertilizer is such that it blends into the lawn well, and is much less noticeable than the usual fertilizers. No bad odors, such as those associated with many organic fertilizers, develop from the use of the ammoniated phosphated by-product of the present invention as a fertilizer.

In order more clearly to disclose the nature of the present invention and the advantages thereof, reference will hereinafter be made to certain specific embodiments which illustrate the flexibility of the herein described process. It should be clearly understood, however, that this is done solely by way of example and is not to be construed as a limitation upon the spirit and scope of the appended claims.

The invention will be described with reference to the drawing, wherein

Figure 1 is a graphical representation showing the yield of furfural from oat hulls at 60 pounds pressure, using different amounts of calcium triple superphosphate as the catalyst;

Fig. 2 is a graphical representation showing the yield of furfural over a period of time, using triple superphosphate, calcium metaphosphate, and sulfuric acid, respectively, as catalysts;

Fig. 3 is a graphical representation showing the effect of time on the yield of furfural, using three different catalysts, and where the digester pressure is 30 pounds gauge;

Fig. 4 is a graphical representation showing the rate of nitrification of two of my fertilizers (graphs 2 and 3) of the present invention, compared to that of certain prior art fertilizers (graphs 4, 5, and 6).

*Calcium metaphosphate as the furfural catalyst.*—Calcium metaphosphate constitutes one of the preferred forms for practicing the present invention. The flexibility of this material as the catalyst is apparent from Table I, which gives the results obtained when the amount of catalyst is varied while operating under substantially constant conditions. It will be evident from an inspection of Table I that high yields of furfural may be obtained using the water and acid-insoluble calcium metaphosphate as catalyst, and furthermore, that the amount of catalyst employed may be varied over a wide range without materially affecting the yield of furfural.

Table I shows the results of four test runs A, B, C, and D, in each of which 4668 grams of oat hulls (dry basis) and 4668 grams of water were placed in a digester with varying amounts of calcium metaphosphate, as indicated in the table. The digester pressure in each instance was 70 pounds gauge, and each run was carried on for four hours. The total furfural yield for each specified quantity of said catalyst is likewise indicated in this table.

TABLE I

| Run | Calcium meta-phosphate | Furfural in total mixed distillate |
|---|---|---|
| | Grams | Per cent |
| A | 333 | 15.1 |
| B | 666 | 14.9 |
| C | 1,332 | 13.9 |
| D | 1,998 | 13.4 |

Calcium metaphosphate as the furfural catalyst produces high yields of furfural over a wide range of pressure conditions, varying from 30 pounds to 70 pounds gauge per square inch, as will be evident from an inspection of Table II, which illustrates the yields of furfural over four-hour periods obtained under substantially the same conditions.

TABLE II

| Run | Pounds pressure in digester | Furfural yield |
|---|---|---|
| | | Per cent |
| A | 30 | 13.73 |
| B | 50 | 14.00 |
| C | 70 | 13.40 |

*Monocalcium phosphate as the furfural catalyst.*—The production of furfural from oat hulls, using monocalcium phosphate commercially available in the form of "triple superphosphate," is illustrated in Table III. The data there indicates that high yields of furfural may be obtained over a wide range of operating conditions, using monocalcium phosphate as the furfural catalyst.

TABLE III

| | Test run No. | | | | | | | |
|---|---|---|---|---|---|---|---|---|
| | 1 | 2 | 3 | 4 | 5 | 6 | 7 | 8 |
| Oat hulls moisture-free basis _____ grams __ | 6,000 | 6,000 | 6,000 | 6,000 | 6,000 | 5,000 | 6,000 | 6,000 |
| Water _____ do ____ | 6,000 | 6,000 | 6,000 | 6,000 | 6,000 | 5,000 | 6,000 | 6,000 |
| Triple superphosphate _____ do ____ | 900 | 2,010 | 2,010 | 2,010 | 2,010 | 1,675 | 2,010 | 2,010 |
| Cooker pressure _____ lbs. gauge __ | 2 hrs. 50# / 2 hrs. 80# | 2 hrs. 30# / 3 hrs. 60# | 2 hrs. 20# / 3 hrs. 40# | 2 hrs. 20# / 3 hrs. 60# | 2.5 hrs. 60# / 2.5 hrs. 68# | 35 | 2.5 hrs. 50# / 2.5 hrs. 58# | 60 |
| Steam flow _____ cc. per min __ | 125 | 91.1 | 84.1 | 150 | 88 | 68 | 98.4 | 165 |
| Time _____ hours __ | 4.0 | 5.0 | 5.0 | 5.0 | 5.0 | 5.0 | 5.0 | 4.0 |
| Furfural yield (percent) based on moisture-free hulls __ | 16.1 | 16.4 | 16.1 | 17.7 | 16.9 | 15.9 | 16.2 | 16.8 |
| Per cent of theoretical __ | 73.5 | 74.5 | 73.1 | 80.8 | 77.2 | 72.6 | 74.0 | 75.0 |
| Furfural in residue _____ per cent __ | 0.87 | 0.67 | 0.51 | 0.57 | 0.4 | 1.8 | 0.6 | 1.7 |
| Moisture in residue _____ do ____ | 27.5 | 29.00 | 15.9 | 14.1 | 30.5 | 25.6 | 29.4 | 20.7 |
| Furfural lost _____ do ____ | 4.9 | 4.84 | 5.13 | 4.23 | 4.6 | 4.2 | 5.1 | 3.9 |

The effect of varying the catalyst concentration when using monocalcium phosphate (commercially available as "triple superphosphate") as the furfural catalyst is shown in Table IV, which indicates that this catalyst may be used in extremely widely varying amounts without detrimentally affecting the yield of furfural.

In this Table IV, each of the test runs was made with 6000 grams (moisture-free basis) of oat hulls, 6000 grams of water, digester pressure at 60 pounds gauge, steam flow at 80 cc. per minute, and cooking time of four hours.

TABLE IV

| Run | Triple super-phosphate catalyst | Furfural yield based on moisture-free hulls | Furfural yield per cent of theoretical |
|---|---|---|---|
| | Grams | Percent | |
| 1 | 300 | 10.0 | 45.66 |
| 2 | 600 | 13.7 | 62.55 |
| 3 | 900 | 14.2 | 64.84 |
| 4 | 1,200 | 14.7 | 67.14 |
| 5 | 1,500 | 14.5 | 66.21 |
| 6 | 1,800 | 14.6 | 66.67 |
| 7 | 2,300 | 14.9 | 68.03 |
| 8 | 3,000 | 14.9 | 68.03 |

The data given in Table IV is graphically presented in Fig. 1.

In order to disclose the advantages of using my catalyst in lieu of the sulfuric acid catalyst of the prior art, reference is made to Fig. 2, which compares the rate and amount of furfural produced using the three catalysts indicated on this figure. The data employed in constructing the graphical representations of Fig. 2 represents the best results that could be obtained after a long series of experiments designed to determine the optimum rate of production and yield that could be obtained with the various catalysts in a short cooking period. It will be evident from an inspection of Fig. 2 that the two phosphates, both of which are orthophosphates under digester conditions, are superior to sulfuric acid in this respect.

The superiority of triple superphosphate and calcium metaphosphate as the furfural catalyst for producing furfural from oat hulls at 30 pounds gauge pressure, while simultaneously producing a less degraded cellulosic by-product, is graphically illustrated in Fig. 3. This figure shows the rate and amount of furfural produced from oat hulls at 30 pounds pressure, when using the optimum amounts of the three catalysts indicated. The figure indicates that the two calcium phosphate salts are superior to sulfuric acid as a furfural-producing catalyst, the yield at the end of four hours being appreciably greater, and curves 2 and 3 definitely indicating that the furfural yield is still rapidly increasing with time. Furthermore, the residues from the phosphate cooks still contain a relatively large amount of furfural, part of which could have been obtained by lengthening the cooking time, while the sulfuric acid residue was practically devoid of potential furfural. For instance, the residue of the run of curve 1 of Fig. 3 contained .32 per cent of furfural, while the residue of the runs of curves 2 and 3 of Fig. 3 contained, respectively, 3.68 per cent and 2.5 per cent.

The cellulosic by-product resulting from the use of sulfuric acid as a catalyst is decomposed to a much greater extent than when the catalyst of the present invention is employed. This effect is illustrated in Table V, which shows the weights of residues produced with the three different catalysts of Fig. 3 at 30 pounds pressure.

TABLE V

| Cook No. | Oat hulls | Catalyst | Weight of residues after a deduction was made for moisture and catalyst content |
|---|---|---|---|
| | | | Grams |
| 1 | 6,000 | $H_2SO_4$ | 3,517 |
| 2 | 6,000 | Triple superphosphate | 4,157 |
| 3 | 6,000 | Calcium metaphosphate | 4,400 |

The data indicate that the triple superphosphate decomposes the cellulosic by-product to a considerably less extent than sulfuric acid, and also that the calcium metaphosphate, in turn, decomposes the by-product considerably less than the triple superphosphate. Consequently, the less decomposed cellulosic by-products are available in greater quantities for other uses.

The production of furfural and fertilizer in accordance with the preferred form of the invention is illustrated in the following example:

*Example.*—6000 parts of pentosan-containing materials, preferably oat hulls, are mixed with 2010 parts of triple superphosphate or 1430 parts of calcium metaphosphate, and the mixture is placed in a steel digester together with 6000 parts of water. The mixture is stirred for 5 hours at 30 to 60 pounds gauge pressure, with steam flowing through the mass at 70 to 300 parts of condensed vapor per minute. After 5 hours the furfural yield is 70 to 80 per cent of the theoretical.

At the end of this period, the steam pressure is brought to zero, and the theoretical amount of ammonia desired in the completed fertilizer is introduced in the form of anhydrous gaseous ammonia. The fixation of ammonia is rapid, and at the end of a short period an especially effective fertilizer is produced. The ammoniation process requires no extraordinary heat or excess ammonia in order to produce a product having 4.5 per cent to 5 per cent nitrogen.

If desired, instead of carrying out the ammoniation step in the digester, the phosphated residue may be removed from the cooker after the separation of the furfural, the residue placed on a traveling platform, conveyed through a drier, and then collected in a separate vessel for ammoniation. In this case also no extraordinary heat for ammoniation is required to produce a fertilizer having 4.5 per cent to 5 per cent nitrogen. Typical data illustrating the production of a phosphated ammoniated residue in accordance with the present invention and the results obtained thereby is shown in Table VI.

TABLE VI

*Preparation of and availability of phosphorus in phosphated-ammoniated furfural residue fertilizer*

| Preparation of residues | | | Ammoniation of phosphated residue | |
|---|---|---|---|---|
| Oat hulls | Triple super-phosphate | Water | Phosphated residue | $NH_3$ |
| Pounds | Pounds | Pounds | Pounds | Pounds |
| 17,000 | 5,800 | 4,250 | 27,632 | 939 |
| 9,711 | 2,691 | 1,900 | 12,351 | 906 |

*Product contained (air dry basis)*

| Nitrogen | | | | Phosphorus | | |
|---|---|---|---|---|---|---|
| Total | Water insoluble nitrogen | Water soluble nitrogen | Water insoluble nitrogen insoluble in 2% KMnO$_4$ | Total | H$_2$O sol. P$_2$O$_5$ | Ammonium citrate insol. P$_2$O$_5$ |
| Percent | Percent | Percent | Percent | Percent | Percent | Percent |
| 3.4 | 1.3 | 2 | 0.10 | 14.44 | 8.7 | 1.6 |
| 5.45 | 1.3 | 4.15 | 0.10 | 14.44 | 8.7 | 0.6 |

These data indicate that the theoretical fixation of ammonia was attained, and that the phosphorus and nitrogen are both in a readily available form.

*Rate of nitrification of the ammoniated residue.*—The rate of nitrification of a nitrogenous material in the soil constitutes the best indication of the degree of availability of the nitrogen to plants, and is also an indication of how fast the nitrogen will leach through the soil when subjected to high rainfall.

The rate of nitrification of a phosphated ammoniated residue which was converted into a 5-20-2 and a 4-16-4 fertilizer (the phosphorus being added as the catalyst during the production of furfural, the nitrogen being added by ammoniation, and the potassium being added as potassium chloride to the ammoniated residue) was compared with that of cottonseed meal and ammonium sulfate. The results are presented graphically in Fig. 4, which indicates that the fertilizers in accordance with the present invention nitrified at about the same rate as cottonseed meal and much more slowly than ammonium sufate. Inasmuch as fertilizers which nitrify at about the same rate as cottonseed meal are regarded as optimum, the advantages of the fertilizer produced in accordance with the present invention will be readily apparent. The fertilizer in accordance with the present invention is less acid-forming than ammonium sulfate, and only slightly more acid-forming than cottonseed meal.

It will therefore be apparent that the by-product of the present invention may be converted into a fertilizer of superior properties, in that its nitrogen and phosphorus are readily available and yet its nitrogen nitrifies at a desirable rate and the product is only slightly acid-forming. In addition, the ammoniated phosphated residue will not rot ordinary shipping bags, is odorless, flows evenly in a drill, and contains no animal refuse or undesirable odor-producing components. The material may be applied to lawns in large applications without the slightest burning, and because of the fine state of division it constitutes an excellent means of getting organic material down to the very base of the grass blades.

While the foregoing description of my invention has been devoted particularly to the use of calcium orthophosphate salts which exhibit an acidic reaction in a digester mass, the following orthophosphate salts, which also exhibit an acidic reaction in a digester mass, are likewise comprehended within the scope of my invention as set forth above. Table VII gives the furfural yield and other pertinent data from oat hulls, using aluminum acid orthophosphate, hemibasic calcium phosphate, and hemibasic sodium phosphate as the catalysts for the reaction.

TABLE VII

| | Test Run No. | | |
|---|---|---|---|
| | 1 | 2 | 3 |
| Oat hulls moisture-free basis grams | 6,000 | 5,000 | 5,000 |
| Water do | 6,000 | 5,000 | 5,000 |
| Catalysts | Aluminum acid orthophosphate AlH$_3$(PO$_4$)$_2$ | Calcium phosphate (hemibasic) CaH$_{10}$(PO$_4$)$_4$ | Sodium phosphate (hemibasic) NaH$_5$(PO$_4$)$_2$ |
| Grams catalyst | 500 | 417 | 417 |
| Cooker pressure pounds gauge | 2 hrs. 70#. 2 hrs. 80#. | 2 hrs. 70#. 2 hrs. 80#. | 2 hrs. 70#. 2 hrs. 80#. |
| Steam flow cc. per min | 85.8 | 86.1 | 83.3 |
| Time hours | 4.0 | 4.0 | 4.0 |
| Furfural yield (percent) based on moisture-free hulls | 15.4 | 14.6 | 13.5 |
| Percent of theoretical | 70.9 | 67.2 | 62.2 |
| Furfural in residue percent | 0.61 | 0.68 | 1.2 |
| Moisture in residue do | 19.9 | 23.9 | 30.0 |
| Furfural lost do | 5.69 | 6.42 | 7.0 |

For practicing the invention herein disclosed, the apparatus employed, as well as the process, may be those shown and described in Brownlee Patents No. 1,919,877, No. 1,919,878, No. 2,059,435, and No. 2,140,572. These patents disclose apparatus by means of which my invention may be practiced on a commercial scale, but it is to be understood that my invention is not restricted to the disclosures of these patents, since other mechanical expedients may prove equally suitable for the commercial use of my invention.

In the foregoing detailed description it will be apparent that many variations may be made without departing from the spirit and scope of the invention. Thus, for example, the ratio of pentosan-containing material to catalyst, the rate of flow and pressure of the steam, the particular method of ammonia fixation, and the time, temperature, and pressure conditions prevailing during the various steps of the process may be varied over a wide range of conditions without detrimentally affecting the yield of furfural or the quality of the products obtained. Many other variations will be readily apparent to those skilled in the art. I therefore intend to be limited only in accordance with the following patent claims.

I claim:

1. In the manufacture of furfural by a process involving the catalytic hydrolysis of pentosan-containing material to pentoses and the dehydration of the resulting pentoses to furfural, and the simultaneous production of a residual product capable of use as a fertilizer, the improvement which comprises the carrying out of the said reaction in the presence of not substantially less than about 10% of a calcium phosphate having an acidic reaction in the reaction mass, the said amount of calcium phosphate being calculated on the basis of the dry weight of the pentosan-containing material and sufficient to render said residual product valuable as a fertilizer.

2. The improvement defined in claim 1 wherein the calcium phosphate is calcium triple superphosphate.

3. The improvement defined in claim 1 wherein the calcium phosphate is calcium metaphosphate.

4. The improvement defined in claim 1 wherein the calcium phosphate is hemi-basic calcium phosphate, $CaH_{10}(PO_4)_4$.

5. The process of manufacturing furfural and simultaneously producing a phosphated cellulosic by-product which includes the steps of hydrolyzing pentosan-containing material with a reagent consisting of at least 5% of a calcium phosphate that possesses an acidic reaction in the reaction mass, whereby the pentosans are converted into furfural, and then separating the furfural and water from the pentosan-depleted cellulosic residue, which latter is a product containing a sufficient quantity of phosphate to be valuable as a fertilizer.

6. The process defined in claim 5 wherein the calcium phosphate is calcium triple superphosphate.

7. The process defined in claim 5 wherein the calcium phosphate is calcium metaphosphate.

8. The process defined in claim 5 wherein the calcium phosphate is hemi-basic calcium phosphate, $CaH_{10}(PO_4)_4$.

9. The process of manufacturing furfural and producing a phosphated organic fertilizer which comprises the process defined in claim 5, and then ammoniating the pentosan-depleted cellulosic residue.

10. The process defined in claim 5 wherein the pentosan-depleted cellulosic residue is ammoniated with anhydrous ammonia to produce a substantially dry phosphated and ammoniated partially degraded cellulosic organic fertilizer.

11. The process of simultaneously manufacturing furfural and producing a phosphated organic fertilizer which includes hydrolyzing pentosan-containing material in the presence of water and a reagent consisting of a phosphate salt having an acidic reaction in the reaction mass, the amount of said phosphate salt employed, as calculated on the weight of the said pentosan-containing material, being within the range of approximately 5% to 50%, steam-distilling the products of hydrolysis with superheated steam to remove the water and generated furfural from the pentosan-depleted cellulosic by-product, ammoniating said by-product with anhydrous gaseous ammonia to produce an ammoniated phosphated pentosan-depleted residue, and incorporating a supplementary plant food with said residue to produce a fertilizer having a predetermined plant food content.

12. The process defined in claim 11 wherein the phosphate salt comprises calcium triple superphosphate.

13. The process defined in claim 11 wherein the phosphate salt comprises calcium metaphosphate.

14. The process defined in claim 11 wherein the phosphate salt comprises hemi-basic calcium phosphate, $CaH_{10}(PO_4)_4$.

15. The process defined in claim 11 wherein the said supplementary plant food comprises a potassium salt.

16. The process defined in claim 11 wherein the said pentosan-containing material comprises oat hulls.

17. The process defined in claim 11 wherein the said pentosan-containing material comprises cottonseed hulls.

18. The improvement defined in claim 1 wherein the said pentosan-containing material comprises oat hulls.

19. The improvement defined in claim 1 wherein the said pentosan-containing material comprises cottonseed hulls.

20. A phosphated organic fertilizer characterized by a low rate of nitrification and comprising an ammoniated, partially degraded, pentosan-depleted residue obtained by the removal of furfural and water from pentosan-containing cellulosic material which has been hydrolyzed in the presence of a phosphate salt that possesses an acidic reaction in the reaction mass, the amount of phosphate in said fertilizer being not less than approximately 8% calculated as $P_2O_5$.

21. The product of claim 20 wherein the phosphate salt is calcium triple superphosphate.

22. The product of claim 20 wherein the phosphate salt is calcium metaphosphate.

23. Process of producing furfural and a pentosan-depleted residue from pentosanic raw material which comprises hydrolyzing the pentosan thereof and converting it into furfural by a reagent consisting of at least 5% by weight, as calculated on the raw material, of a calcium phosphate having an acid reaction in the reaction mass at a temperature above the normal boiling point of water, said amount of calcium phosphate being sufficient to render said residue valuable as a fertilizer.

24. Process of producing furfural from oat hulls which comprises admixing the same with water and from about 5% to about 50%, as calculated on the weight of the oat hulls, of a reagent consisting of a calcium phosphate capable of developing an acid reaction in the presence of water at an elevated temperature, and heating the resulting mixture under a pressure of between 30 and 70 pounds per square inch gauge pressure for about five hours, with steam flowing through the mixture during the operation to carry off the formed furfural, the stated amount of calcium phosphate being sufficient to render said residue valuable as a fertilizer.

HARVEY C. MILLAR.